United States Patent
Karpin et al.

(10) Patent No.: US 9,405,401 B2
(45) Date of Patent: Aug. 2, 2016

(54) EDGE-BY-EDGE INTEGRATION AND CONVERSION

(71) Applicant: Parade Technologies, Ltd., Santa Clara, CA (US)

(72) Inventors: Oleksandr Karpin, Lviv (UA); Ihor Musijchuk, Lviv (UA); Igor Kolych, Lviv (UA); Volodymyr Bihday, Lviv (UA); Victor Kremin, Lviv (UA)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 77 days.

(21) Appl. No.: 13/629,432

(22) Filed: Sep. 27, 2012

(65) Prior Publication Data

US 2014/0015768 A1    Jan. 16, 2014

Related U.S. Application Data

(60) Provisional application No. 61/670,730, filed on Jul. 12, 2012.

(51) Int. Cl.
 *G06F 3/041*    (2006.01)
 *G06F 3/044*    (2006.01)

(52) U.S. Cl.
 CPC .............. *G06F 3/0418* (2013.01); *G06F 3/044* (2013.01)

(58) Field of Classification Search
 CPC ..... G06F 3/041; G06F 3/0416; G06F 3/0412; G06F 3/04883; G06F 3/0488; G06F 3/016; G06F 3/044
 USPC ..................... 345/173–179; 178/18.01–18.04
 See application file for complete search history.

(56) References Cited

U.S. PATENT DOCUMENTS

| | | | | |
|---|---|---|---|---|
| 4,085,427 A * | 4/1978 | Dunn | ........................ | 360/77.05 |
| 4,698,461 A | 10/1987 | Meadows et al. | | |
| 5,053,757 A | 10/1991 | Meadows et al. | | |
| 5,374,787 A * | 12/1994 | Miller et al. | ............... | 178/18.06 |
| 6,239,389 B1 * | 5/2001 | Allen et al. | ............... | 178/18.01 |
| 6,624,835 B2 | 9/2003 | Willig | | |
| 6,819,804 B2 * | 11/2004 | Tenze et al. | .................... | 382/262 |
| 7,808,255 B2 * | 10/2010 | Hristov et al. | ................ | 324/686 |
| 2001/0019633 A1 * | 9/2001 | Tenze et al. | .................... | 382/261 |
| 2008/0246496 A1 * | 10/2008 | Hristov et al. | ................ | 324/686 |
| 2009/0096758 A1 * | 4/2009 | Hotelling et al. | ............. | 345/173 |
| 2010/0155153 A1 * | 6/2010 | Zachut | ........................ | 178/18.03 |
| 2012/0062474 A1 * | 3/2012 | Weishaupt et al. | ........... | 345/173 |
| 2012/0062498 A1 * | 3/2012 | Weaver et al. | ................ | 345/174 |

(Continued)

OTHER PUBLICATIONS

Fang, Wendy; Reducing Analog Input Noise in Touch Screen Systems; Texas Instruments, Application Report; Sep. 2007.

(Continued)

*Primary Examiner* — Olga Merkoulova
(74) *Attorney, Agent, or Firm* — Morgan, Lewis & Bockius LLP

(57) ABSTRACT

An apparatus includes a transmission system configured to transmit a drive signal to a touch screen device. The apparatus also includes a reception system configured to integrate an output signal received from a touch screen device in response to the drive signals and to filter the integrated output signal to suppress noise in the output signal, wherein the reception system is configured to integrate the output signal for a period of time that is less than or equal to a signal period corresponding to the drive signal.

21 Claims, 7 Drawing Sheets

(56) References Cited

U.S. PATENT DOCUMENTS

2012/0139846 A1    6/2012  Krah
2012/0200524 A1*  8/2012  Vallis et al. .................. 345/174

OTHER PUBLICATIONS

Davy, Michael; An Adaptive Pre-filtering Technique for Error-Reduction Sampling in Active Learning; Trinity College Dublin, Ireland; IEEE International Conference on Data Mining Workshop, 2008; 10 Pages.

International Search Report for International Application No. PCT/US12/70850 dated Jan. 29, 2013; 3 pages.

Written Opinion of the International Searching Authority for International Application No. PCT/US12/70850 dated Jan. 29, 2013; 6 pages.

* cited by examiner

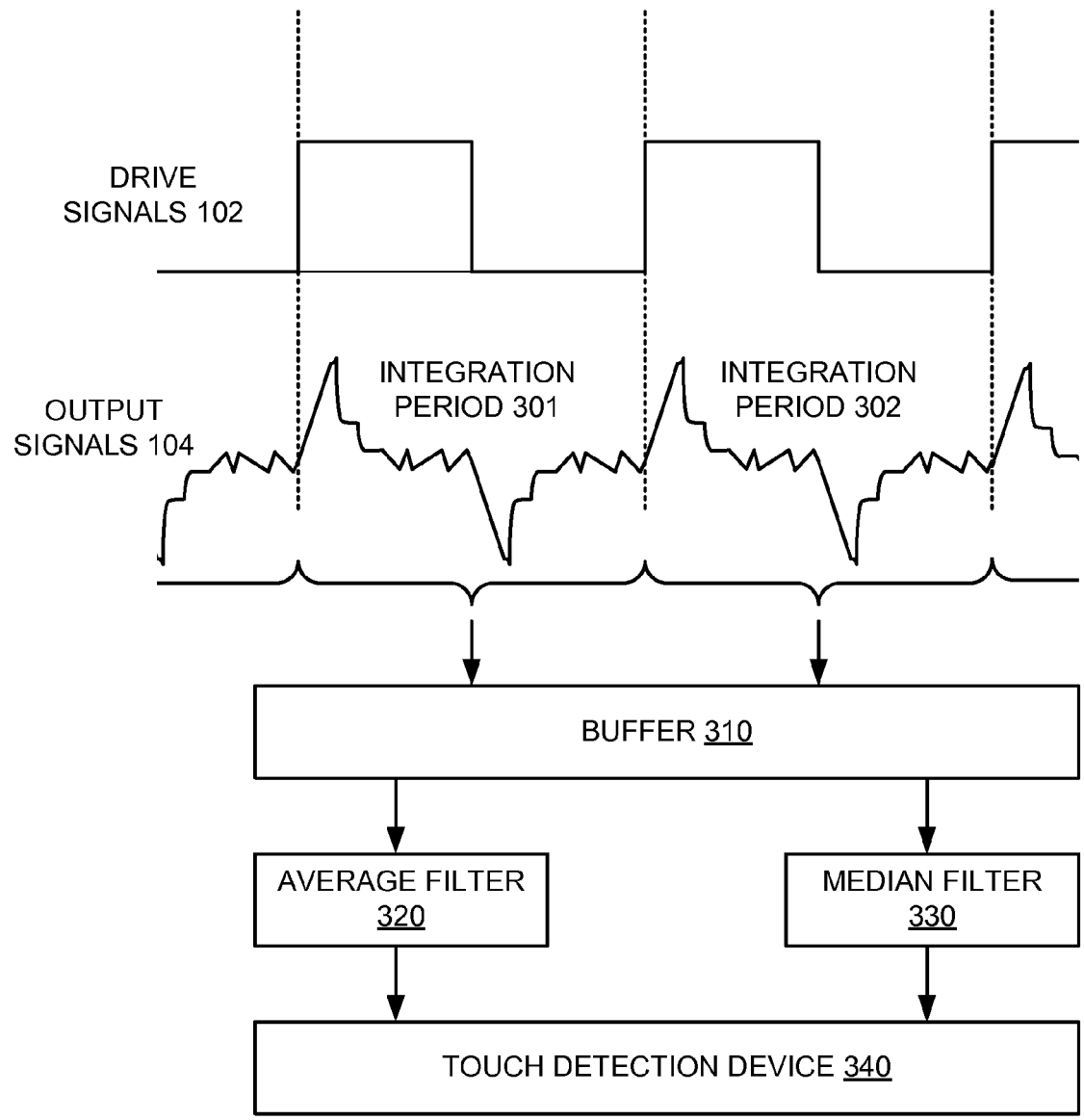

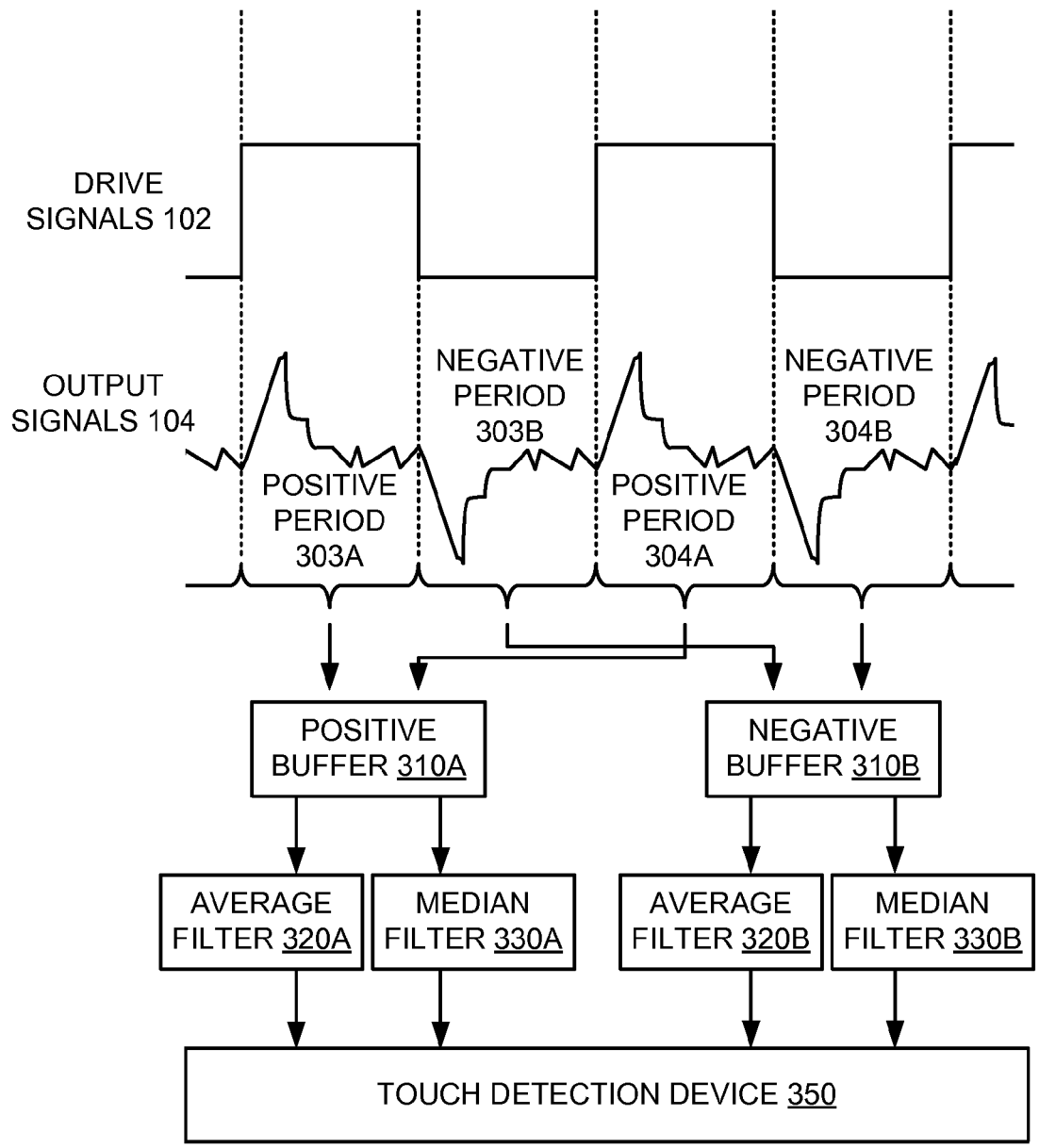

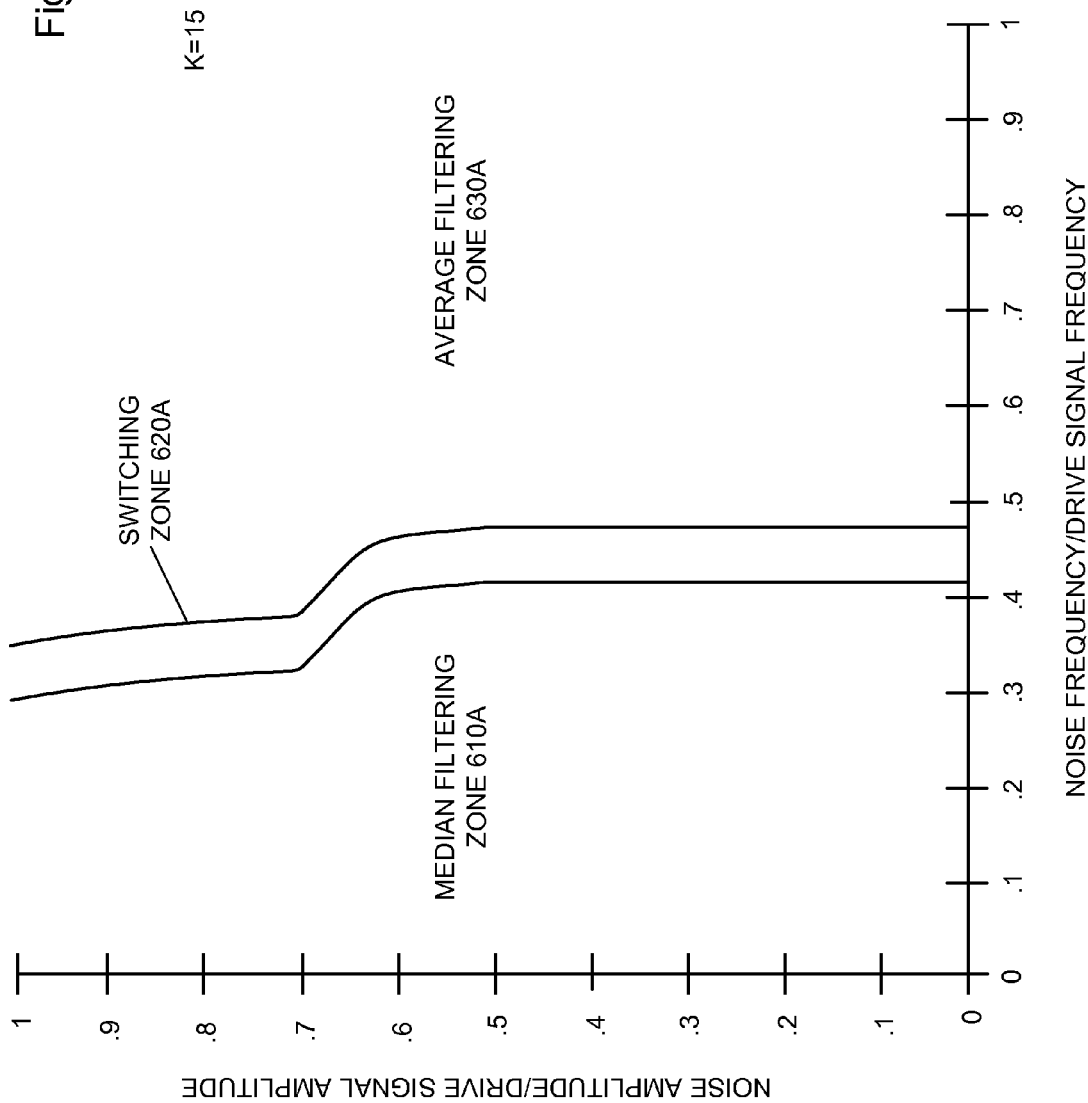

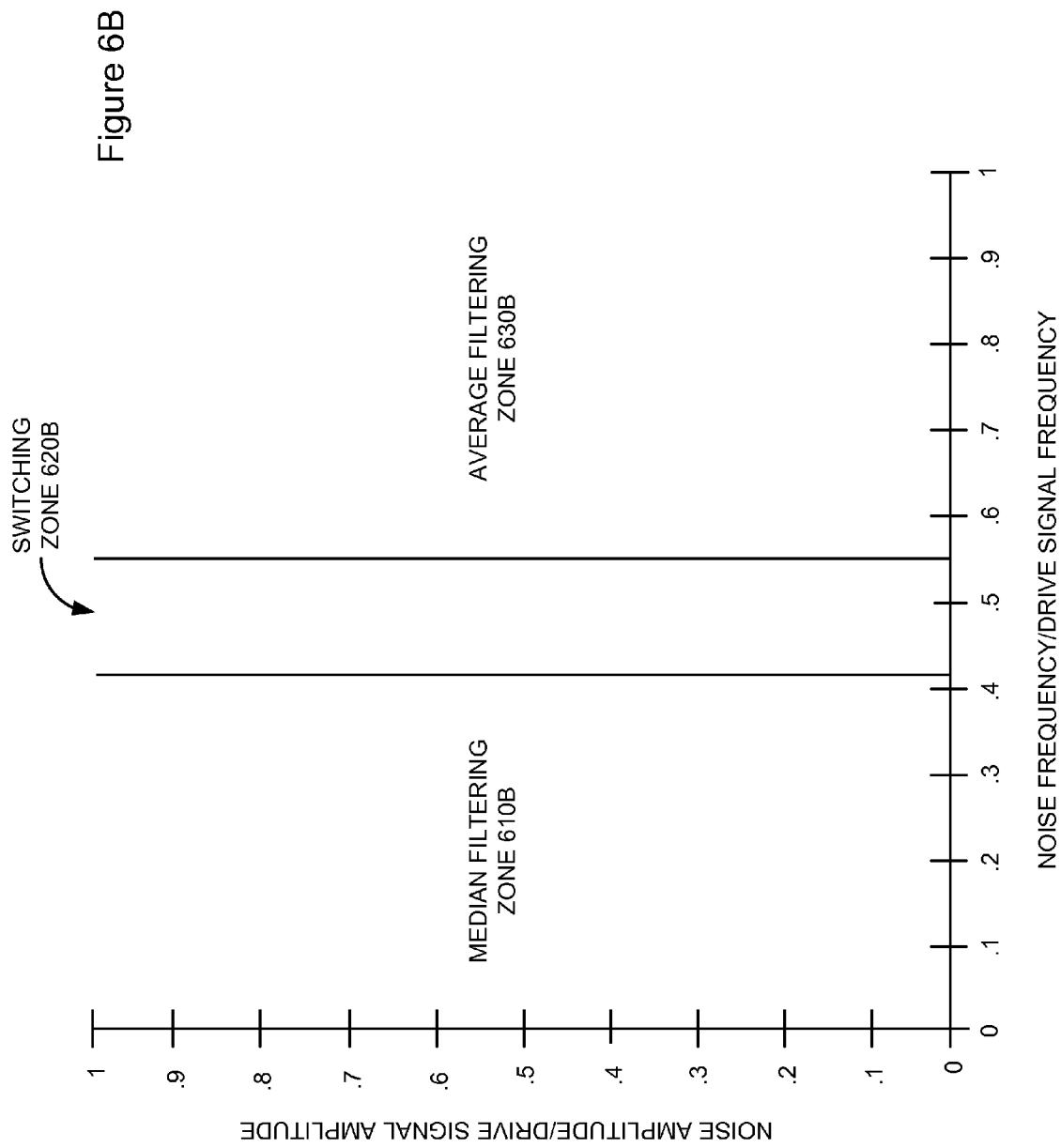

EDGE-BY-EDGE INTEGRATION AND CONVERSION

RELATED APPLICATIONS

This patent application claims priority to U.S. Provisional Patent Application No. 61/670,730, filed Jul. 12, 2012, all of which is incorporated by reference herein.

TECHNICAL FIELD

This disclosure relates generally to electronic systems, and, more particularly, to noise suppression associated with touch screen devices.

BACKGROUND

Many electronic systems can receive output signals from a touch screen device in response to periodically transmitted drive signals provided to the touch screen device. Since a magnitude of the output signals can be based, at least in part, on a presence of an object in contact with or proximate to a touch screen panel, the electronic systems can utilize the output signals to detect touch events associated with the touch screen panel, for example, when an object is in contact with the touch screen panel or proximate to the touch screen panel.

A presence of noise in the touch screen devices can alter the magnitude of the output signals. The electronic systems can include techniques to suppress the noise in the output signals, which help to eliminate inaccurate detection of touch events associated with the touch screen panel. Previous noise suppression techniques include integrating the output signals over a time period corresponding to multiple periods of the transmitted drive signals to generate output values and then averaging a preset number of the output values to generate a noise suppressed signal. While these previous noise suppression techniques could reduce the effect of aberrant noise in the output signal on touch detection, systemic noise injected into the output signals, for example, from a liquid crystal display (LCD) or a battery charger, remained in the noise suppressed signal, effecting the accuracy of touch detection by the electronic systems.

DESCRIPTION OF THE DRAWINGS

FIGS. 3A and 3B are block diagrams illustrating example data flows through the reception system shown in FIG. 2.

FIGS. 6A and 6B are example graphs illustrating dynamic filter switching.

DETAILED DESCRIPTION

An electronic system can include a transmission system to transmit a drive signal to a touch screen device and a reception system to receive an output signal generated in response to the drive signal and to suppress noise in the output signal. In some embodiments, the reception system can reduce an integration time of the output signal, for example, to a full-period or a half of a period of the corresponding drive signal, and to filter the integrated output signal to suppress the noise. The reception system also can detect characteristics of the noise and dynamically adjust a type of filtering utilized to suppress the detected noise. Embodiments are shown and described below in greater detail.

Figure 1:
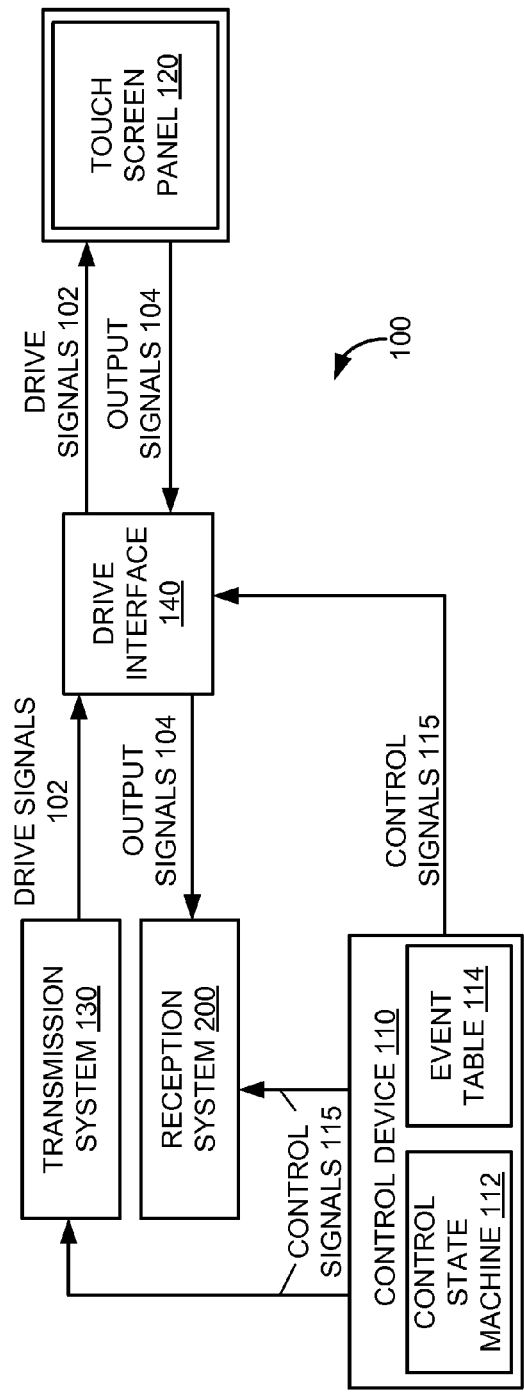
FIG. 1 is a block diagram example of a touch screen system.

FIG. 1 is a block diagram example of a touch screen system 100. Referring to FIG. 1, the touch screen system 100 can include a touch screen panel 120 having sensor elements, for example, disposed as a two-dimensional matrix, to detect touches on a surface of the touch screen panel 120 in response to drive signals 102. The touches on the surface of the touch screen panel 120 can be detection of an object, such as a stylus, finger, palm, cheek, ear, or the like, in contact with or proximate to the touch screen panel.

The touch screen system 100 can include a transmission system 130 to generate the drive signals 102 and provide the drive signals 102 to the touch screen panel 120. In some embodiments, the drive signals 102 can be periodic, for example, including rising edges indicating an initiation of a positive or higher portion of the drive signals 102 and including falling edges indicating an initiation of a negative or lower portion of the drive signals 102.

The touch screen panel 120 can receive the drive signals 102 from the transmission system 130 via a drive interface 140 and provide output signals 104 to a reception system 200 via the drive interface 140. The output signals 104 can indicate to the reception system 200 whether the surface of the touch screen panel 120 was touched, for example, in contact with or proximate to an object. For example, when the touch screen panel 120 includes capacitive sensor elements, a touch of the surface of the touch screen panel 120 can alter a capacitance associated with the capacitive sensor elements associated with the touch. The drive signals 102 can provide a voltage to one node of the capacitive sensor elements, while the other node corresponds to the output signals 104 provided to the reception system 200 via the drive interface 140.

The reception system 200 can analyze the output signals 104 to determine whether a portion of the touch screen panel 120 had been touched. In some embodiments, the reception system 200 can measure the capacitance associated with the capacitive sensor elements from the output signals 104 to determine whether the touch screen panel had been touched. The capacitance associated with the capacitive sensor elements can be measured from the output signals 104 in various ways, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms.

The output signals 104 also can include noise, for example, introduced into the output signals 104 by the touch screen panel 120 or other component of the electronic system 100, such as a battery charger or a liquid crystal display (LCD). The reception system 200 can process the output signals 104 to suppress the noise from the output signals 104 and increase an accuracy of touch detection. Embodiments of the noise suppression are shown and described below in greater detail.

The touch screen system 100 can include a control device 110 to control sensing operations associated with a touch screen panel 120. The control device 110 can include a control state machine 112 and an event table 114 that can work in combination to generate control signals 115 that control the operations of the touch screen system 100. For example, the control device 110 can utilize the control signals 115 to prompt the transmission system 130 and drive interface 140 to generate drive signals 102 having a particular amplitude or frequency. The control device 110 also can utilize the control signals 115 to prompt the reception system 200 to implement various noise suppression techniques, embodiments of which will be shown and described below in greater detail.

Figure 2:
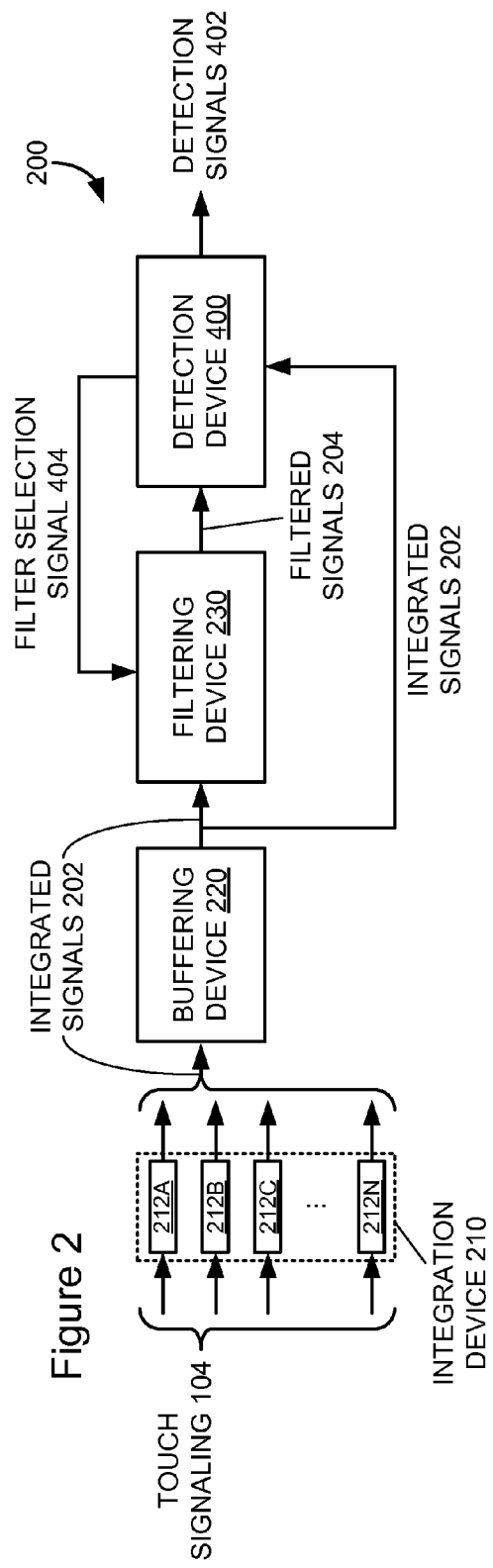
FIG. 2 is a block diagram example of a reception system in the touch screen system of FIG. 1.

FIG. 2 is a block diagram example of the reception system 200 in the touch screen system 100 of FIG. 1. Referring to FIG. 2, the reception system 200 can include an integration device 210 to integrate (or accumulate over a time period) the output signals 104 received from the touch screen panel 120 via the drive interface 140. In some embodiments, the touch screen panel 120 can output the output signals 104 in multiple different channels, for example, corresponding to particular physical locations on the touch screen panel 120. The integration device 210 can include multiple integrators 212A-212N or integration stages to integrate the multiple channels of the output signals 104.

The integrators 212A-212N can integrate the channels of the output signals 104 over a period of time that is less than or equal to a signal period of the drive signals 102, to generate integrated output signals 202. In some embodiments, the integrators 212A-212N can be set by the control device 110 to integrate in a full-period mode or a half-period mode. In the full-period mode, the integrators 212A-212N can integrate the output signals 104 for a period of time equal to a full-period of the drive signals 102, and can be aligned based on the rising or falling edges of the drive signals 102. In the half-period mode, the integrators 212A-212N can integrate the output signals 104 for a period of time equal to a half-period of the drive signals 102, and can be aligned based on the rising and falling edges of the drive signals 102.

The reception system 200 can include a buffering device 220 to store multiple values corresponding to integrated signals 202. In some embodiments, the buffering device 220 can include multiple first-in first-out (FIFO) buffers with an aperture or buffer size capable of storing multiple integrated signals 202. In the full-period mode, the buffering device 220 can allocate one FIFO buffer to each channel associated with the integrated signals 202. In the half-period mode, the buffering device 220 can allocate multiple FIFO buffers to each channel associated with the integrated signals 202.

The buffering device 220 can output the values corresponding to the integrated signals 202 to a filtering device 230, which can suppress noise present in the integrated signals 202 through a variety of filtering techniques. For example, the filtering device 230 can average a plurality of the integrated signals 202 from the buffering device 220 to generate filtered signals 204. The filtering device 230 also can select one of the integrated signals 202 from the buffering device 220 to output as the filtered signals 204.

The reception system 200 can include a detection device 400 to determine whether a touch of the touch screen panel 120 has occurred based, at least in part, on the filtered signals 204. In some embodiments, the detection device 400 can compare the filtered signals 204 to a capacitance mapping of the touch screen panel 120, detect variances between the filtered signals 204 to the capacitance mapping of the touch screen panel 120, and determine whether any of the variances correspond to a touch event in the touch screen panel 120. The detection device 400 can generate detection signals 402 to indicate whether a touch of the touch screen panel 120 has occurred.

The detection device 400 also can perform noise detection, for example, when prompted by the control device 110. The control device 110 can prompt the reception system 200 to perform a listener scan of the touch screen panel 120, for example, when no drive signals 102 are provided to the touch screen panel 120, to determine an amplitude, a frequency, and a type of noise present in the touch screen system 100. The detection device 400 can generate a filter selection signal 404 to direct the filtering device 230 to dynamically select a filtering technique for integrated signals 202 based, at least in part, on the amplitude, the frequency, and/or the type of noise present in the touch screen system 100.

FIGS. 3A and 3B are block diagrams illustrating example data flows through the reception system 200 shown in FIG. 2. Referring to FIG. 3A, the reception system 200 can perform a full-period integration of the output signals 104. The output signals 104 can be integrated over integration periods 301 and 302, and the integrated signals can be stored in a common buffer 310. The buffer 310 can store multiple values corresponding to sequentially integrated output signals 104, for example, as a FIFO buffer. The durations of the integration periods 301 and 302 can be approximately equal to a duration of a signal period of the drive signals 102. By reducing the integration period 301 or 302 down to a full-period of the drive signals 102, the reception system 200 can avoid integrator saturation due to large systemic noise, for example, introduced by battery chargers and liquid crystal displays.

The reception system 200 can implement multiple filtering techniques, such as an average filter 320 and a median filter 330. The buffer 310 can provide a plurality of the stored integrated signals to at least one of the average filter 320 and the median filter 330, which can suppress noise from the integrated signals. The average filter 320 can average the integrated signals and provide the average to a touch detection device 340. The median filter 330 can run through the integrated signals entry by entry, replace each entry with the median of neighboring entries. The pattern of neighbors can be called a "window", which can slide, entry by entry, over the integrated signals. The median filter 330 can select one of a plurality of the integrated signals as representative of the integrated signals stored in the buffer 310, for example, selecting a median integrated signal from the buffer 310, and provide the selected integrated signal to the touch detection device 340.

Although FIG. 3A shows two types of filters, such as average filter 320 and median filter 330, in some embodiments, other filters may be utilized to suppress noise, such as an amplitude limiting filter or a sorting filter. The amplitude limiting filter can reject or replace integrated signals having an amplitude that falls outside of a predetermined range. In some embodiments, the amplitude limiting filter can replace amplitudes falling outside of the range with a value corresponding to the maximum value in the range or corresponding to a neighboring value that fell within the range. The sorting filter can sort the integrated signals, for example, by amplitude of the integrated signals, and then filter the sorted integrated signals. In some embodiments, the sorting filter can apply weights to the sorted integrated signals, for example, implementing an outlier filter to eliminate outlying amplitudes with the weighting or implementing a finite-impulse response filter that can apply non-linear weighting to the sorted integrated signals.

The touch detection device 340 can utilize the average of the integrated signals or the median integrated signal to detect whether a touch event has occurred in the touch screen panel. For example, the touch detection device 340 can compare the average of the integrated signals or the median integrated signal to a predetermined capacitance mapping of the touch screen panel to locate any variances in the capacitance that could annunciate a touch event has occurred in the touch screen panel.

Referring to FIG. 3B, FIG. 3B is similar to FIG. 3A with the following differences. The reception system 200 can perform half-period integration of the output signals 104, for example, by separately integrating the output signals 104 over integration periods 303A, 303B, 304A, and 304B. The durations of the integration periods 303A, 303B, 304A, and 304B can correspond to half of the duration of the signal period of the drive signals 102, and can be aligned with the rising or falling edges of the drive signals 102. In some embodiments, the integration periods 303A and 304A can correspond to positive periods of drive signals 102, while integration periods 303B and 304B can correspond to negative periods of drive signals 102. By reducing the integration periods 303A, 303B, 304A, and 304B down to a half-period of the drive signals 102, the reception system 200 can avoid integrator saturation due to large systemic noise.

The reception system 200 can store the integrated signals in multiple buffers, such as positive buffer 310A and negative buffer 310B. The positive buffer 310A can store the integrated signals 104 corresponding to positive portions of the drive signals 102, such as during positive periods 303A and 304A. The negative buffer 310B can store the integrated signals 104 corresponding to negative portions of the drive signals 102, such as during positive periods 303B and 304B. Both the positive buffer 310A and the negative buffer 310B can be FIFO buffers.

By separately integrating and buffering the output signals 104 corresponding to positive and negative portions of the drive signals 102, the reception system 200 can separately filter the integrated touch signaling based on whether it corresponds to positive or negative portions of the drive signals 102. This separate filtering allows the reception system 200 to overcome any manufacturing deficiencies that can cause variations during integration of the output signals 104. For example, when the reception system 200 utilizes separate capacitors for positive and negative signal period integration, any difference in capacitance between the capacitors introduced during manufacturing can cause the reception system 200 to not be able to filter out some noise (based on the capacitance difference) from the integrated signals. Thus, by separately storing and filtering signals integrated with different capacitors, the reception system 200 can overcome manufacturing variances and suppress noise more accurately.

The reception system 200 can include multiple filters, such as average filters 320A and 320B and median filters 330A and 330B. The positive buffer 310A can provide a plurality of integrated signals to at least one of filters 320A or 330A, while the negative buffer 310B can provide a plurality of integrated signals to at least one of filters 320B or 330B. The average filters 320A and 320B can average the integrated signals, respectively, and provide the average of the integrated signals to a touch detection device 350. The median filters 330A and 330B can select a median of the integrated signals, respectively, and provide the median integrated signal to the touch detection device 350.

The touch detection device 350 can utilize the average of the integrated signals or the median integrated signal to detect whether a touch event has occurred in the touch screen panel. For example, the touch detection device 350 can compare the average of the integrated signals or the median integrated signal to a predetermined capacitance mapping of the touch screen panel to locate any variances in the capacitance that could annunciate a touch event has occurred in the touch screen panel.

Figure 4:
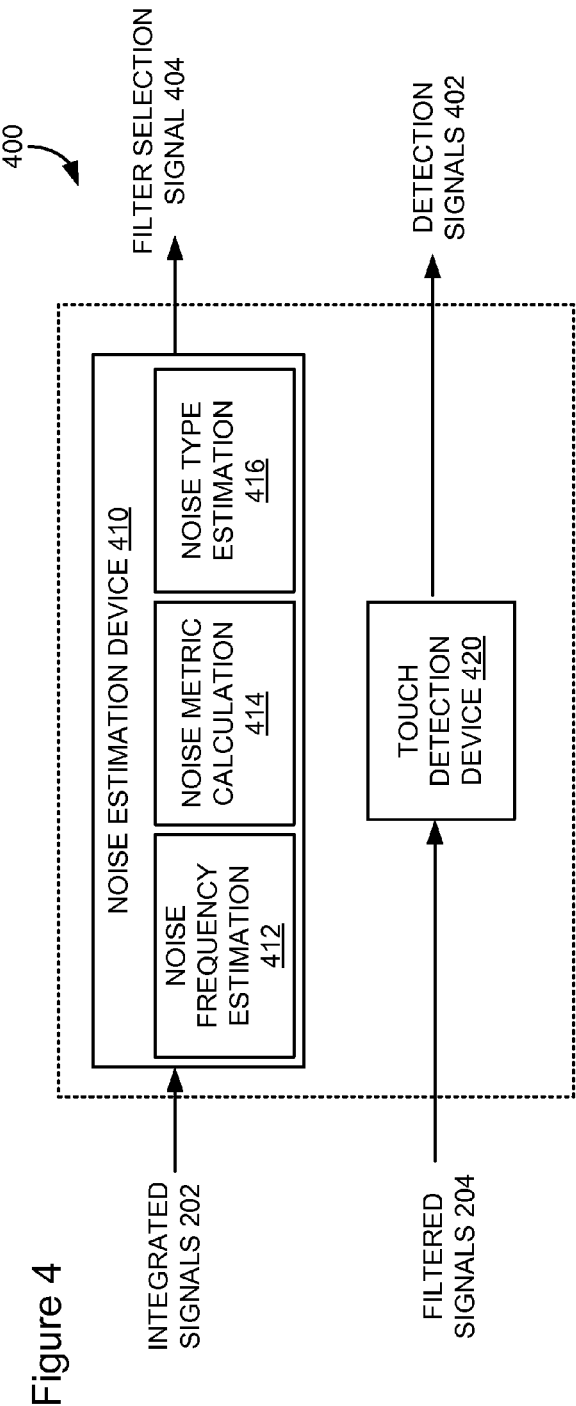
FIG. 4 is a block diagram example of a detection device in the reception system of FIG. 2.

FIG. 4 is a block diagram example of a detection device 400 in the reception system 200 of FIG. 2. Referring to FIG. 4, the detection device 400 can perform multiple functions including detecting touch events in the touch screen panel 120 and to detecting noise present in the touch screen system 100.

The detection device 400 can include a touch detection device 420 to detect touch events associated with the touch screen panel 120 based, at least in part, on the filtered signals 204. In some embodiments, the touch detection device 420 can compare the filtered signals 204 to a capacitance mapping of the touch screen panel 120, detect variances between the filtered signals 204 to the capacitance mapping of the touch screen panel 120, and determine whether any of the variances correspond to a touch event in the touch screen panel 120. The touch detection device 420 can generate detection signals 402 to indicate whether a touch of the touch screen panel 120 has occurred.

The detection device 400 can detect noise in the touch screen system 100, for example, from battery chargers or a liquid crystal display, through a listener scan of the touch screen system 100. The listener scan of the touch screen system 100 can allow the touch screen panel 120 to output the output signals 104 when no drive signals 102 are being provided to the touch screen panel 120, and can allow the reception system 200 to integrate the output signals 104 and analyze the integrated signals 202 to determine various characteristics of noise present in the touch screen system 100.

The detection device 400 can include a noise estimation device 410 to receive integrated signals 202 produced during a listener scan and generate a filter selection signal 404 based on the integrated signals 202. The filter selection signal 404 can be utilized, for example, by the filtering device 230, to determine a type of filtering to perform on integrated signals 202 generated during active operation.

The noise estimation device 410 can include noise frequency estimation 412 functionality to determine a frequency corresponding to the noise present in the touch screen system 100. The noise frequency estimation 412 can analyze the integrated signals 202 generated during the listener scan to determine the frequency of the noise. For example, when the noise present in the touch screen system 100 corresponds to a battery charger or a liquid crystal display, the noise can be periodically introduced into the touch screen system 100. Since noise suppression techniques remove noise with different degrees of success at different noise frequencies, the noise estimation device 410 can utilize the noise frequency to generate the filter selection signal 404.

The noise estimation device 410 can include noise metric calculation 414 functionality to determine a characteristic of the noise. For example, the noise metric calculation 414 can $$K = \frac{\sum_{i=1}^{N} |Data_i - \overline{Data}|}{\max(Data) - \min(Data)} \quad \text{Equation 1}$$

In Equation 1, Data can correspond to the integrated signals 202 received from a buffer, N can correspond to a total number of integrated signals 202 are received, and K can be a noise parameter that can be utilized to generate the filter selection signal 404. Since noise parameter K can correspond to a variance from an average of the integrated signals, the noise estimation device 410 can utilize the noise parameter K to generate the filter selection signal 404.

The noise estimation device 410 can include noise type estimation 416 functionality to ascertain a type of noise present in the touch screen system 100, such as random noise or high frequency noise. Embodiments of noise type estimation will be discussed below with reference to FIG. 5 in greater detail. The noise estimation device 410 can utilize the noise type to generate the filter selection signal 404.

Figure 5:
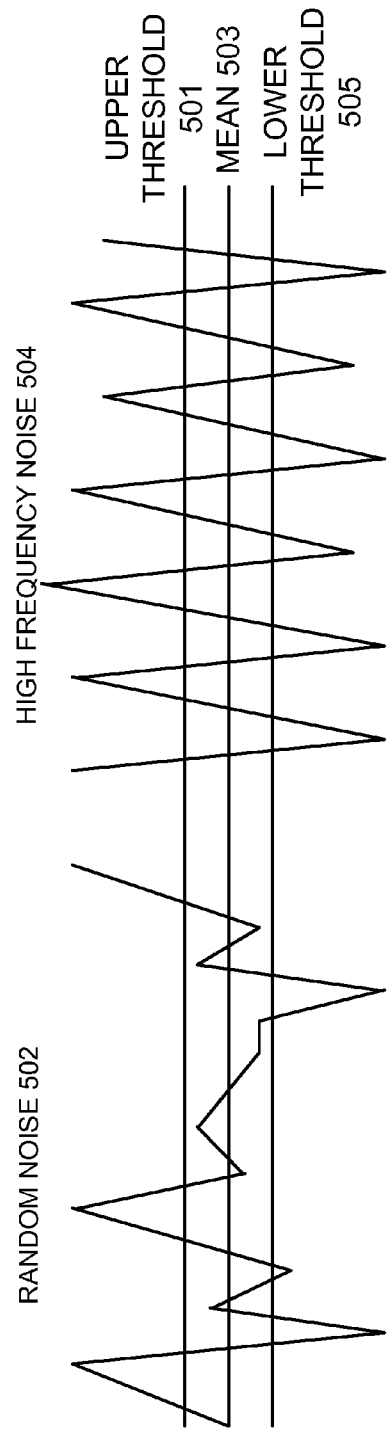
FIG. 5 is an example graph illustrating multiple types of noise capable of being present in the touch screen system.

FIG. 5 is an example graph illustrating multiple types of noise capable of being present in the touch screen system. Referring to FIG. 5, two types of noise, random noise 502 and high frequency noise 504 are shown relative to their respective mean values 503. The noise estimation device 410 can estimate a noise type by determining a percentage of the noise that falls between an upper threshold 501 and a lower threshold 505. The upper threshold 501 and the lower threshold 505 can correspond to a percentage of the peak-to-peak value in the noise, for example, 20% of the peak to peak value as shown in FIG. 5.

In some embodiments, when less than predetermined fraction, for example, ⅓, of the noise amplitude falls outside of the upper threshold 501 and the lower threshold 505, the noise estimation device 410 can estimate the noise to be random noise 502. Otherwise, the noise estimation device 410 can estimate the noise to be high frequency noise 504.

FIGS. 6A and 6B are example graphs illustrating dynamic filter switching. Referring to FIGS. 6A and 6B, the graphs show multiple zones where certain types of filtering can perform noise suppression more effectively over various other noise suppression options. Since the frequency of the noise as compared to a frequency of drive signals can effect noise suppression technique selection, the x-axis of the graphs is based on a ratio between noise frequency and drive signal frequency. The y-axis of the graphs is based on a ration of noise amplitude and drive signal amplitude.

In the graph shown in FIG. 6A, a noise metric K equal to 15 was utilized to generate the multiple filtering zones. The graph shows a median filtering zone 610A on the left side of the graph corresponding to a lower ratio between noise frequency and drive signal frequency. In this median filtering zone 610A, the noise estimation device 410 can select median filtering to suppress noise from the integrated signals 202.

The graph shows an average filtering zone 630A on the right side of the graph corresponding to a higher ratio between noise frequency and drive signal frequency. In this median filtering zone 630A, the noise estimation device 410 can select average filtering to suppress noise from the integrated signals 202.

Between the median filter zone 610A and average filter zone 630A is a switching zone 620A, which either filtering technique can be utilized by the reception system 200. In some embodiments, when the characteristics of the noise relative to the drive signals fall in the switching zone 620A, the reception system 200 can utilize dynamically select either filtering technique or have a default filtering technique that can be preselected on such occasions.

As the ratio between the noise amplitude and the drive signal amplitude increases, the graph shows an enlargement of the average filtering zone 630A and a contraction of the median filtering zone 610A. Although not shown in FIG. 6A, a variation in K can alter the positioning of the zones 610A, 620A, and 630A.

The graph in FIG. 6B shows a median filtering zone 610B on the left side of the graph corresponding to a lower ratio between noise frequency and drive signal frequency. In this median filtering zone 610B, the noise estimation device 410 can select median filtering to suppress noise from the integrated signals 202.

The graph shows an average filtering zone 630B on the right side of the graph corresponding to a higher ratio between noise frequency and drive signal frequency. In this median filtering zone 630B, the noise estimation device 410 can select average filtering to suppress noise from the integrated signals 202.

Between the median filter zone 610B and average filter zone 630B is a switching zone 620B, which either filtering technique can be utilized by the reception system 200. In some embodiments, when the characteristics of the noise relative to the drive signals fall in the switching zone 620B, the reception system 200 can utilize dynamically select either filtering technique or have a default filtering technique that can be preselected on such occasions.

Figure 7:
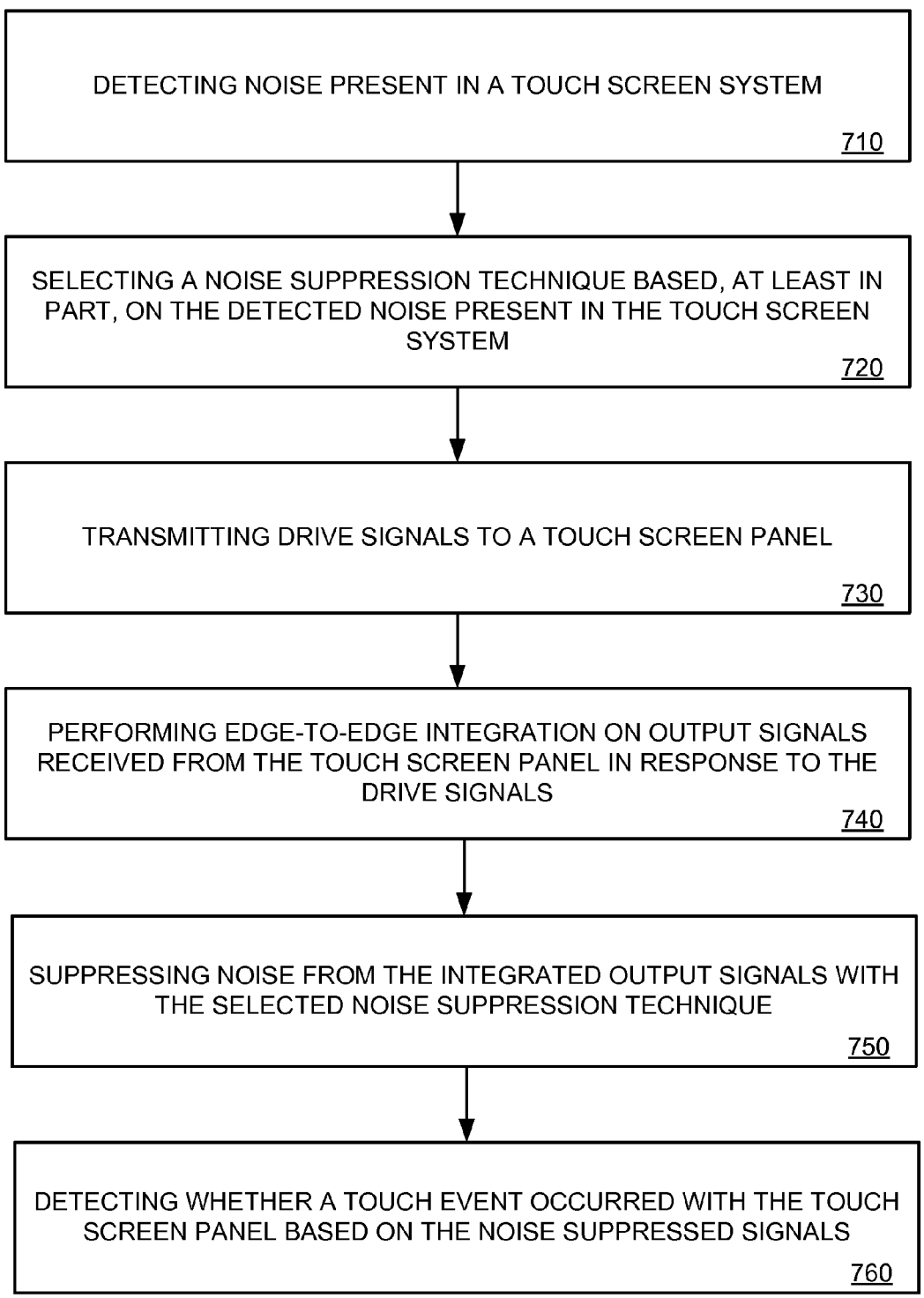
FIG. 7 is an example operational flowchart for the touch screen system.

FIG. 7 is an example operational flowchart for the touch screen system 100. In a block 710, the touch screen system 100 can detect noise present in a touch screen system. In some embodiments, the touch screen system 100 can perform a listener scan of a touch screen panel, for example, without drive signals being provided to the touch screen panel. The touch screen system 100 can analyze output signals from the touch screen panel to determine various characteristics of noise present in the touch screen system. For example, the touch screen system 100 can determine a frequency of the noise, an amplitude of the noise, a variance of the amplitude relative to a mean of the noise, a type of the noise, such as random noise or high frequency noise, etc.

In a block 720, the touch screen system 100 can select a noise suppression technique based, at least in part, on the detected noise present in the touch screen system. In some embodiments, the touch screen system 100 can select between average filtering or median filtering the output signals to suppress the noise from the output signals.

In a block 730, the touch screen system 100 can transmit drive signals to a touch screen panel. The touch screen panel can provide output signals the touch screen system 100 in response to the drive signals. The output signals can indicate to the touch screen system 100 whether the surface of the touch screen panel was touched, for example, in contact with or proximate to an object. For example, when the touch screen panel includes capacitive sensor elements, a touch of the surface of the touch screen panel can alter a capacitance associated with the capacitive sensor elements associated with the touch. The drive signals can provide a voltage to one node of the capacitive sensor elements, while the other node corresponds to the output signals provided to the touch screen system 100. Although FIG. 7 shows the touch screen system 100 can select a noise suppression technique based on an operation performed in block 710, in some embodiments, the touch screen system 100 can select the noise suppression technique based, at least in part, on noise present in output signals received in response to the drive signals transmitted in block 730.

In a block 740, the touch screen system 100 can perform edge-to-edge integration on output signals received from the touch screen panel in response to the drive signals. The edge-to-edge integration can integrate the output signals over duration that is less than or equal to a full-period, for example, the edge-to-edge integration can be equal to a full-period or half-period of the drive signals. By reducing the integration period down to the full-period or half-period of the drive signals, the touch screen system 100 can avoid integrator saturation due to large systemic noise, for example, introduced by battery chargers and liquid crystal displays.

In a block 750, the touch screen system 100 can suppress noise from the integrated output signals with the selected noise suppression technique. In some embodiments, the touch screen system 100 can apply an average filter or a median filter to a group of integrated output signals to suppress noise from the group of integrated output signals.

In a block 760, the touch screen system 100 can detect whether a touch event occurred with the touch screen panel based on the noise suppressed signals. The touch screen system 100 can determine whether a touch of the touch screen panel has occurred based, at least in part, on the noise suppressed signals. In some embodiments, the touch screen system 100 can compare the noise suppressed signals to a known capacitance mapping of the touch screen panel when no touch event is present, detect variances between the noise suppressed signals to the capacitance mapping of the touch screen panel, and determine whether any of the variances correspond to a touch event in the touch screen panel.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

One of skill in the art will recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. An apparatus comprising:
a transmission system configured to transmit a drive signal to a touch screen device, the drive signal comprising a plurality of drive signal half-periods; and
a reception system configured to integrate an output signal received from the touch screen device in response to the drive signal, the output signal comprising a plurality of output signal half-periods respectively corresponding to the plurality of drive signal half-periods, wherein the reception system is configured to integrate a first set of one or more of the plurality of output signal half-periods to obtain a first integrated value and to integrate a second set of one or more of the plurality of output signal half-periods to obtain a second integrated value and wherein the reception system comprises a first buffer to store the first integrated value and a second buffer to store the second integrated value.

2. The apparatus of claim 1, wherein the first set of one or more of the plurality of output signal half-periods comprises only two consecutive output signal half-periods.

3. The apparatus of claim 1, wherein the first set of one or more of the plurality of output signal half-periods comprises only one output signal half- period.

4. The apparatus of claim 1, wherein the first set of one or more of the plurality of output signal half-periods comprises only one output signal half-period corresponding to a positive half-period of the plurality of drive signal half-periods; and
wherein the second set of one or more of the plurality of output signal half-periods comprises only one output signal half-period corresponding to a negative half-period of the plurality of drive signal half-periods, wherein the reception system is configured to select a first filter from a plurality of filters for the first buffer and to select a second filter from the plurality of filters for the second buffer, and wherein the reception system is configured to filter integrated values stored in the first buffer using the first filter and filter integrated values stored in the second buffer using the second filter.

5. The apparatus of claim 1, wherein the touch screen device is a self-capacitive sensing device.

6. The apparatus of claim 1, wherein the reception system is configured to detect a type of noise present in the touch screen device and select a type of filtering to perform on the integrated output signal in response to the detection of the type of noise present in the touch screen device.

7. The apparatus of claim 1, wherein integrating the output signal includes accumulating values of the output signal over a time period that is less than or equal to one signal period of the drive signal.

8. A method comprising:
  integrating, by a touch detection system, an output signal received from a touch screen device, wherein the output signal comprises a plurality of output signal half-periods respectively corresponding to a plurality of drive signal half-periods of a drive signal applied to the touch screen device, and wherein the integrating comprises:
    (i) integrating a first set of one or more of the plurality of output signal half-periods to obtain a first integrated value; and
    (ii) integrating a second set of one or more of the plurality of output signal half-periods to obtain a second integrated value;
  storing the first integrated value in a first buffer of the touch detection system;
  storing the second integrated value in a second buffer of the touch detection system; and
  filtering, by the touch detection system, a set of integrated values comprising at least the first integrated value and the second integrated value with a noise suppression filter selected from a plurality of noise suppression filters based on a type of noise present in the touch screen device; and
  detecting, by the touch detection system, from the filtered signal whether an object is proximate to a panel in the touch screen device.

9. The method of claim 8, further comprising detecting, by the touch detection system, the type of noise present in the touch screen device prior to receiving the signal from the touch screen device.

10. The method of claim 9, wherein detecting the type of noise present in the touch screen device further comprises identifying a frequency of the noise present in the touch screen device, and wherein filtering the set of integrated values further comprises averaging the set of integrated values or selecting a median filter for the set of integrated values based, at least in part, on the frequency of the noise present in the touch screen device.

11. The method of claim 9, wherein detecting the type of noise present in the touch screen device further comprises determining characteristics of the noise present in the touch screen device correspond to random noise or high frequency noise, and wherein filtering the set of integrated values further comprises averaging the set of integrated values or selecting a median filter for the set of integrated values based, at least in part, on the characteristics of the noise present in the touch screen device.

12. The method of claim 8, further comprising transmitting, by the touch detection system, the drive signal to the touch screen device, wherein the touch screen device is configured to output the output signal to the touch detection system in response to the drive signal.

13. The method of claim 8, wherein the first set of one or more of the plurality of output signal half-periods comprises only two consecutive output signal half-periods.

14. The method of claim 8, wherein the first set of one or more of the plurality of outputs signal half-periods comprises only one output signal half-periods.

15. The method of claim 12, further comprising:
  buffering, by the touch detection system, a set of positive integrated values comprising at least the first integrated value in the first buffer and a set of negative integrated values comprising at least the second integrated value in the second buffer, wherein the first set of the plurality of output signal half-periods comprises only one output signal half-period corresponding to a positive half-period of the plurality of drive signal half periods and the second set of the plurality of output signal half-periods comprises only one output signal half-period corresponding to a negative half-period of the plurality of drive signal half-period; and
  separately filtering, by the touch detection system, the set of positive integrated values and the set of negative integrated values.

16. A method comprising:
  detecting, by a touch screen system, characteristics of noise present in a touch screen panel;
  selecting, by the touch screen system, a noise suppression filter from a plurality of noise suppression filters based, at least in part, on the characteristics of the noise present in the touch screen panel; and
  suppressing, by the touch screen system, noise from an output signal from the touch screen panel with the selected noise suppression filter.

17. The method of claim 16, further comprising detecting, by the touch screen system, from the noise suppressed signal whether an object is proximate to the touch screen panel.

18. The method of claim 16, further comprising:
  transmitting, by the touch screen system, a drive signal to the touch screen panel; and
  receiving, by the touch screen system, the output signal from the touch screen panel in response to the drive signal.

19. The method of claim 18, further comprising performing edge-by-edge integration of the output signal over a duration that is less than or equal to two half-periods of the drive signal.

20. The method of claim 19, further comprising:
  buffering, by the touch screen system, positive integrated values corresponding to positive half-periods of the drive signal in a first buffer and negative integrated values corresponding to negative half-periods of the drive signal in a second buffer; and
  separately filtering, by the touch screen system, the positive integrated values and negative integrated values.

21. The method of claim 16, wherein the noise suppression filter includes at least one of an average filter, a median filter, an amplitude limiting filter, or a sorted order filter.

* * * * *